(12) United States Patent
Shi et al.

(10) Patent No.: US 10,286,456 B2
(45) Date of Patent: May 14, 2019

(54) TOOL BIT HOLDER

(71) Applicant: TTI (Macao Commercial Offshore) Limited, Macau (MO)

(72) Inventors: Zhao Jun Shi, Dongguan (CN); Can Quan Huang, Dongguan (CN); Shao Lin Xia, Dongguan (CN); Jun Jun Hao, Dongguan (CN)

(73) Assignee: TTI (MACAO COMMERICAL OFFSHORE) LIMITED, Macau (MO)

( * ) Notice: Subject to any disclaimer, the term of this patent is extended or adjusted under 35 U.S.C. 154(b) by 40 days.

(21) Appl. No.: 15/159,167

(22) Filed: May 19, 2016

(65) Prior Publication Data

US 2017/0333999 A1 Nov. 23, 2017

(51) Int. Cl.
  *B23B 31/107* (2006.01)
  *B23B 31/06* (2006.01)
  *B25B 23/00* (2006.01)

(52) U.S. Cl.
  CPC .......... *B23B 31/1071* (2013.01); *B23B 31/06* (2013.01); *B25B 23/0035* (2013.01)

(58) Field of Classification Search
  CPC ........ B23B 31/1071; B23B 2231/0252; B23B 31/107; B23B 31/22; B23B 31/263; B23B 31/003; Y10T 279/17752; Y10T 279/17196; Y10T 279/17145; Y10T 279/17811; Y10T 279/3481; Y10T 279/3487
  See application file for complete search history.

(56) References Cited

U.S. PATENT DOCUMENTS

| 3,436,086 | A | * | 4/1969 | Glenzer | ................... B23G 1/46 |
| | | | | | 279/30 |
| 4,184,692 | A | * | 1/1980 | Benson | ............... B23B 31/1071 |
| | | | | | 279/75 |
| 6,270,085 | B1 | | 8/2001 | Chen et al. | |
| 6,325,393 | B1 | | 12/2001 | Chen et al. | |
| 6,457,916 | B2 | | 10/2002 | Wienhold | |

(Continued)

FOREIGN PATENT DOCUMENTS

| CA | 2411405 A1 | 12/2001 |
| CA | 2411405 C | 7/2006 |

(Continued)

*Primary Examiner* — Daniel W Howell
*Assistant Examiner* — Paul M Janeski
(74) *Attorney, Agent, or Firm* — Michael Best & Friedrich LLP

(57) ABSTRACT

A tool bit holder for connecting a rotary tool to a rotary tool driver. The tool bit holder including a body having a driver end configured to connect to a rotary tool driver and a tool end, a tool retainer bore, and a tool retainer movably received within the tool retainer bore and movable between an engaged position and a retracted position. The tool bit holder further includes an actuator sleeve, a sleeve spring for urging the actuator sleeve towards a first position, a plunger, and a plunger spring urging the plunger towards a loading position. A tool bit received in a tool receiving cavity pushes the plunger to a loaded position, and in the loading position the plunger extends over the tool retainer bore to engage the tool retainer and urge the tool retainer towards the retracted position.

12 Claims, 5 Drawing Sheets

(56) References Cited

U.S. PATENT DOCUMENTS

| | | | |
|---|---|---|---|
| 6,722,667 B2* | 4/2004 | Cantlon | B23B 31/06 |
| | | | 279/155 |
| 6,860,489 B2 | 3/2005 | Chen | |
| 6,935,637 B2 | 8/2005 | Cantlon | |
| 7,922,180 B2* | 4/2011 | Meng | B25B 15/001 |
| | | | 279/143 |
| 8,550,471 B2 | 10/2013 | Huang | |
| 8,622,401 B2 | 1/2014 | Puzio et al. | |
| 8,800,999 B2 | 8/2014 | Puzio et al. | |
| 8,864,144 B2* | 10/2014 | Hsu | B25B 23/0035 |
| | | | 279/128 |
| 9,067,266 B2 | 6/2015 | Puzio et al. | |
| 2001/0043841 A1 | 11/2001 | Wienhold | |
| 2002/0020973 A1 | 2/2002 | Cantlon | |
| 2004/0094908 A1 | 5/2004 | Cantlon | |
| 2004/0188959 A1 | 9/2004 | Chen | |
| 2004/0262856 A1 | 12/2004 | Cantlon | |
| 2005/0116429 A1* | 6/2005 | Chang | B25B 15/001 |
| | | | 279/75 |
| 2006/0022416 A1* | 2/2006 | Chen | B23B 31/107 |
| | | | 279/74 |
| 2006/0163824 A1* | 7/2006 | Sasaki | B23B 31/1071 |
| | | | 279/75 |
| 2009/0008886 A1 | 1/2009 | Shu | |
| 2009/0160138 A1 | 6/2009 | Bohne | |
| 2010/0219593 A1 | 9/2010 | Puzio et al. | |
| 2011/0215538 A1 | 9/2011 | Cornwell et al. | |
| 2012/0025474 A1 | 2/2012 | Huang | |
| 2012/0326399 A1* | 12/2012 | Lin | B23B 31/1071 |
| | | | 279/75 |
| 2012/0326400 A1* | 12/2012 | Lin | B23B 31/1071 |
| | | | 279/75 |
| 2012/0326401 A1 | 12/2012 | Puzio et al. | |
| 2014/0312578 A1 | 10/2014 | Puzio et al. | |
| 2015/0202689 A1* | 7/2015 | Chen | B25B 23/0035 |
| | | | 279/30 |

FOREIGN PATENT DOCUMENTS

| | | |
|---|---|---|
| CN | 1095657 A | 11/1994 |
| CN | 1052673 C | 5/2000 |
| CN | 201091925 Y | 7/2008 |
| CN | 201151696 Y | 11/2008 |
| CN | 201168957 Y | 12/2008 |
| CN | 101600528 A | 12/2009 |
| CN | 201659551 U | 12/2010 |
| CN | 202162783 U | 3/2012 |
| CN | 101600528 B | 6/2012 |
| CN | 202684866 U | 1/2013 |
| DE | 4311161 A1 | 10/1994 |
| DE | 19532494 A1 | 3/1997 |
| DE | 102007005033 A1 | 8/2008 |
| DE | 202009009010 U1 | 9/2009 |
| DE | 202011050549 U1 | 11/2011 |
| EP | 0623413 A1 | 11/1994 |
| EP | 0623413 B1 | 7/1998 |
| EP | 1294514 A1 | 3/2003 |
| EP | 1294514 A4 | 2/2007 |
| EP | 2117751 A1 | 11/2009 |
| EP | 2223760 A1 | 9/2010 |
| EP | 2223760 B1 | 2/2012 |
| EP | 2689895 A1 | 1/2014 |
| IN | 5465DELNP2009 | 4/2010 |
| RU | 2009132610 A | 3/2011 |
| WO | 0196052 A1 | 12/2001 |
| WO | 2008092532 | 8/2008 |

\* cited by examiner

TOOL BIT HOLDER

BACKGROUND

The present invention relates to tool bit holders for connecting a rotary tool, such as a driver bit for driving/securing a fastener, to a rotary tool, such as an electric drill or driver. Such tool bit holders are sometime referred to as a chuck or more particularly a collet. In particular, the present invention relates to a drive bit holder with auto-load and/or auto-ejection features, and/or a drive bit holder able to hold one of two different types of tool bits.

SUMMARY

In one embodiment, the invention provides a tool bit holder for connecting a rotary tool to a rotary tool driver. The tool bit holder includes a body having a driver end configured to connect to a rotary tool driver and a tool end. The tool end has a shaft which has a annular side-wall surrounding a longitudinally extending tool receiving cavity open at the tool end and closed towards the driver end. The tool bit holder further includes a tool retainer bore radially extending through the side-wall and communicating with the tool receiving cavity, and a tool retainer movably received within the tool retainer bore and movable between an engaged position in which a portion of the tool retainer extends into the tool receiving cavity and a retracted position in which the tool retainer is retractable out of the tool receiving cavity. The tool bit holder further includes an actuator sleeve disposed annually surrounding the shaft and having a first internal wall portion with a first radial dimension and a second internal wall portion with a second radial dimension. The actuator sleeve longitudinally movable on the shaft between a first position in which the first internal wall portion engages the tool retainer in the engaged position to engage a tool bit received in the tool receiving cavity, and a second position in which the second internal wall portion allows the tool retainer to retract to the retracted position in which the tool retainer is retractable out of the tool receiving cavity to disengage a tool bit received in the tool receiving cavity. The tool bit holder further includes a sleeve spring for urging the actuator sleeve towards the first position, and a plunger disposed in the tool receiving cavity. The plunger having a driver end and a tool end, and movable between a loading position towards the open tool end of the cavity and a loaded position towards the closed driver end of the cavity. The tool bit holder further includes a plunger spring urging the plunger towards the loading position. A tool bit received in the tool receiving cavity pushes the plunger to the loaded position, and in the loading position the plunger extends over the tool retainer bore to engage the tool retainer and urge the tool retainer towards the retracted position.

In another embodiment the invention provides a tool bit holder for connecting a rotary tool to a rotary tool driver. The tool bit holder includes a body having a driver end configured to connect to a rotary tool driver and a tool end. The tool end has a shaft which has a annular side-wall surrounding a longitudinally extending tool receiving cavity open at the tool end and closed towards the driver end. The tool bit holder further includes a tool retainer bore radially extending through the side-wall and communicating with the tool receiving cavity, and a tool retainer movably received within the tool retainer bore and movable between an engaged position in which a portion of the tool retainer extends into the tool receiving cavity and a retracted position in which the tool retainer is retractable out of the tool receiving cavity. The tool bit holder further includes an actuator sleeve disposed annually surrounding the shaft and having a first internal wall portion with a first radial dimension, a second internal wall portion with a second radial dimension and a transition wall portion extending between the first internal wall portion and second internal wall portion. The actuator sleeve is longitudinally movable on the shaft between a first position in which the first internal wall portion engages the tool retainer in the engaged position to engage a tool bit received in the tool receiving cavity, and a second position in which the second internal wall portion allows the tool retainer to retract to the retracted position in which the tool retainer is retractable out of the tool receiving cavity to disengage a tool bit received in the tool receiving cavity. The tool bit holder further includes a sleeve spring for urging the actuator sleeve towards the first position. The transition wall has a chamfer with a curvilinear shape that is complimentary to the tool retainer, and the actuator sleeve has a sleeve intermediate position between the first position and second position in which the chamfer engages the tool retainer and urges the tool retainer towards a retainer intermediate position between the retracted position and the engaged position.

Other aspects of the invention will become apparent by consideration of the detailed description and accompanying drawings. Further aspects of the invention will become apparent from the following description which is given by way of example to illustrate the invention, and the appended claims.

Figure 1:
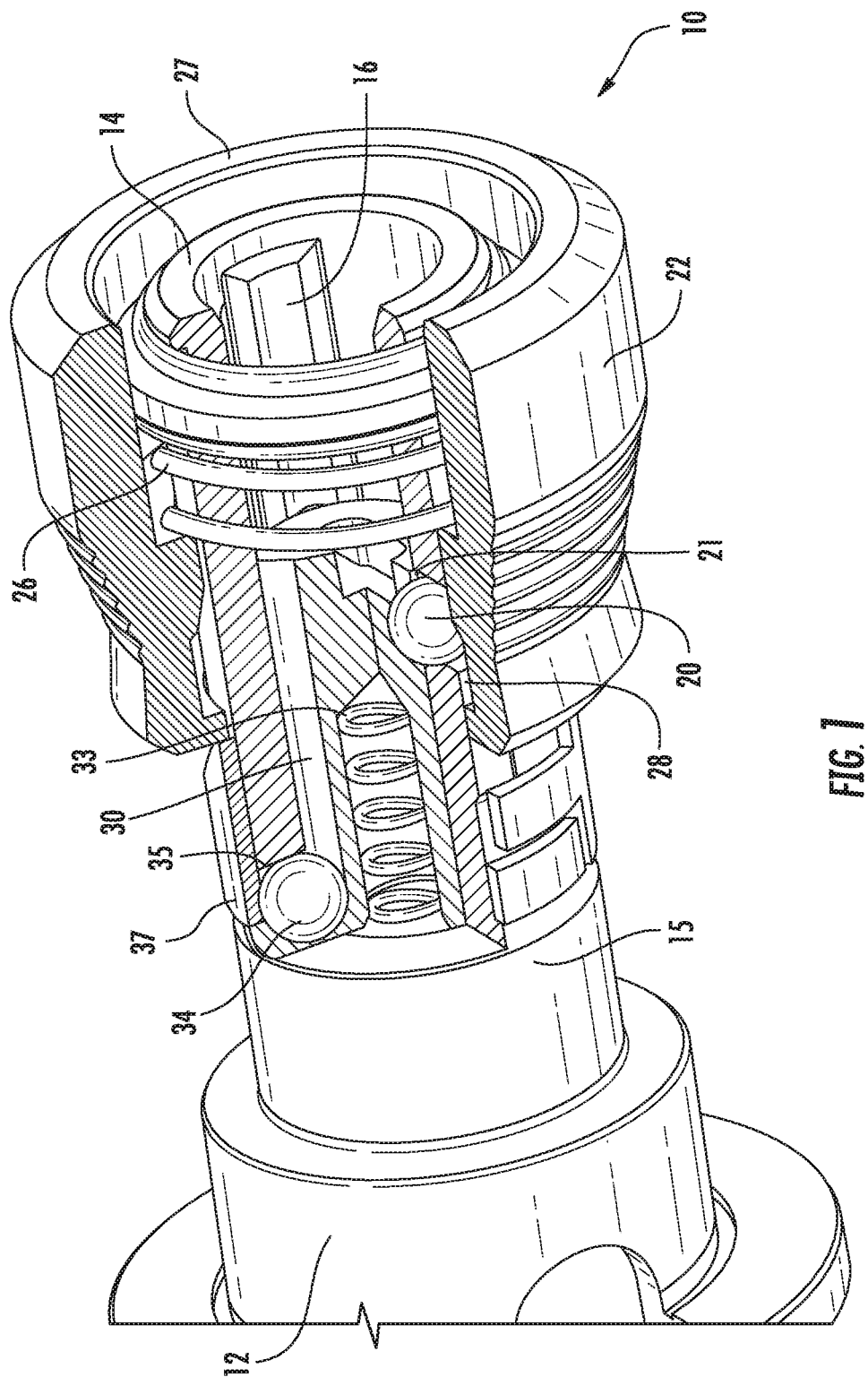
FIG. 1 is a cut away illustration of a tool bit holder according to the invention.
Figure 2:
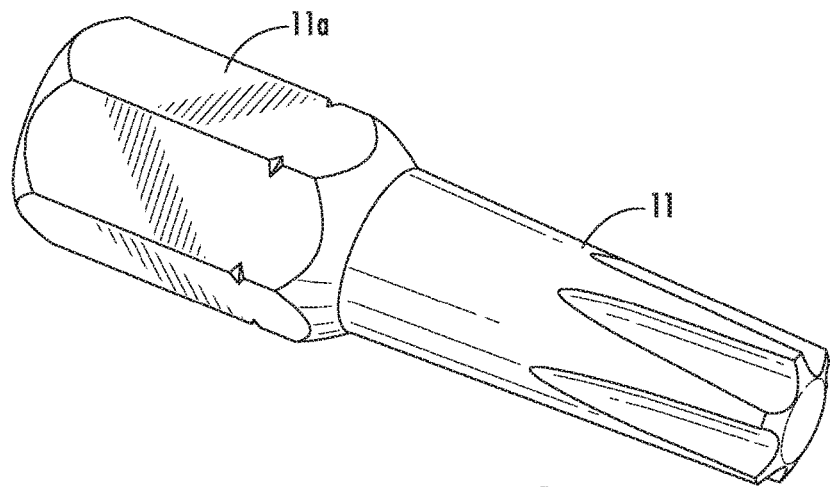
FIG. 2 is an illustration of the tool bit.
Figure 3:
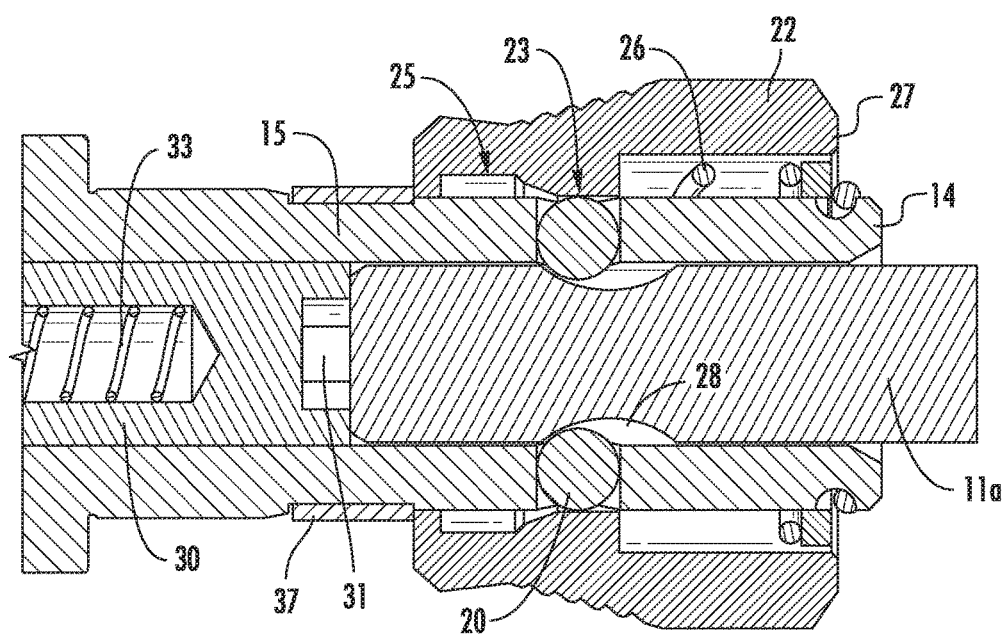
FIG. 3 is a cross section illustration of the tool bit holder with a tool bit shank engaged in the holder.
Figure 4:
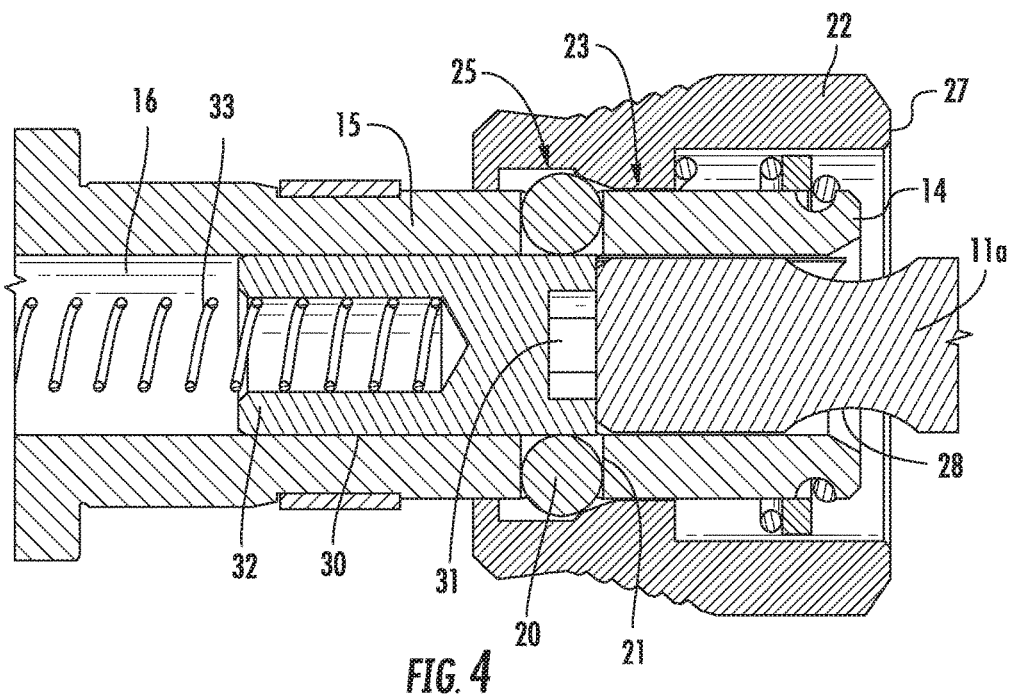
FIG. 4 is a cross section illustration of the tool bit holder with a tool bit shank partially ejected from the holder.
Figure 5:
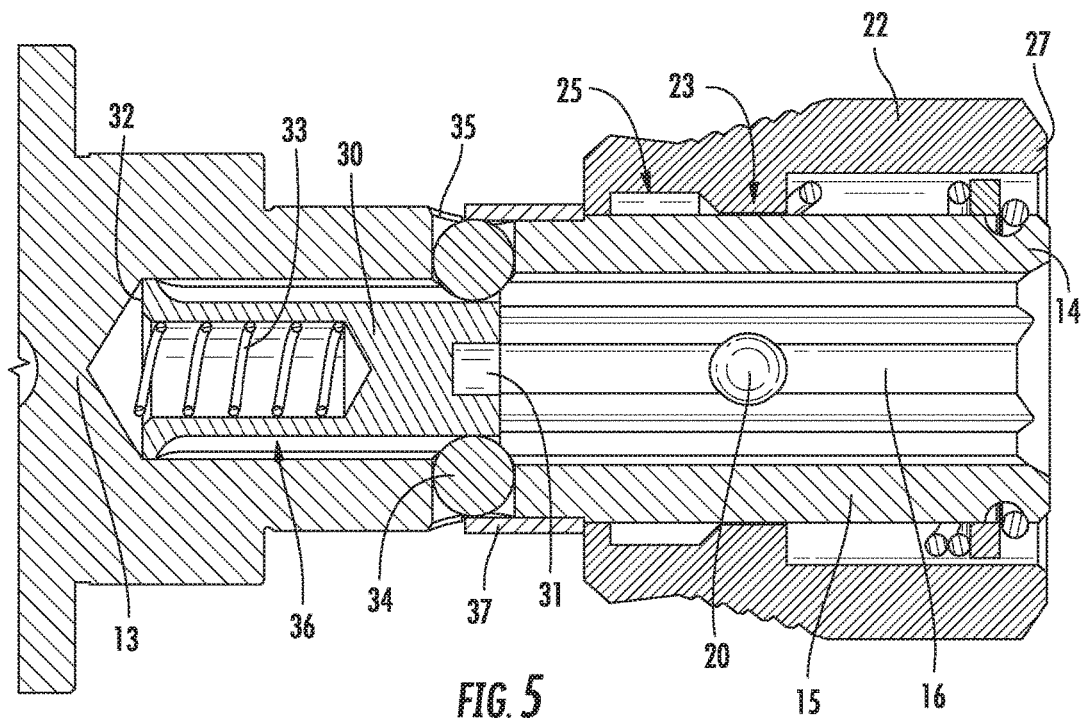
FIG. 5 is a cross section illustration of the tool bit holder with a plunger in a loaded position.
Figure 6:
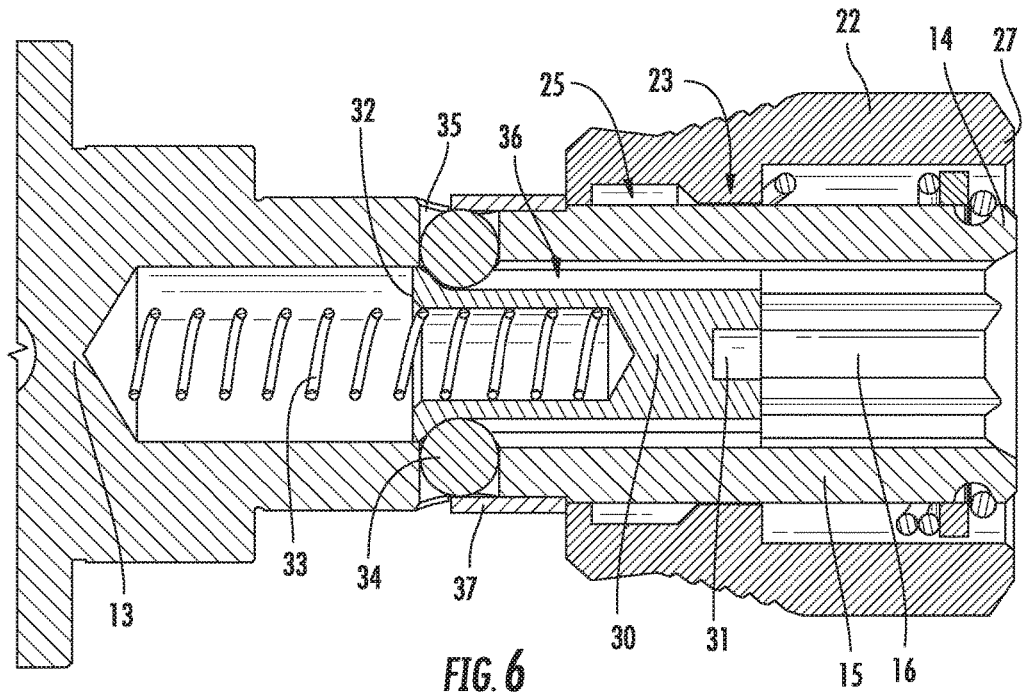
FIG. 6 is a cross section illustration of the tool bit holder with a plunger in a loading position.
Figure 7:
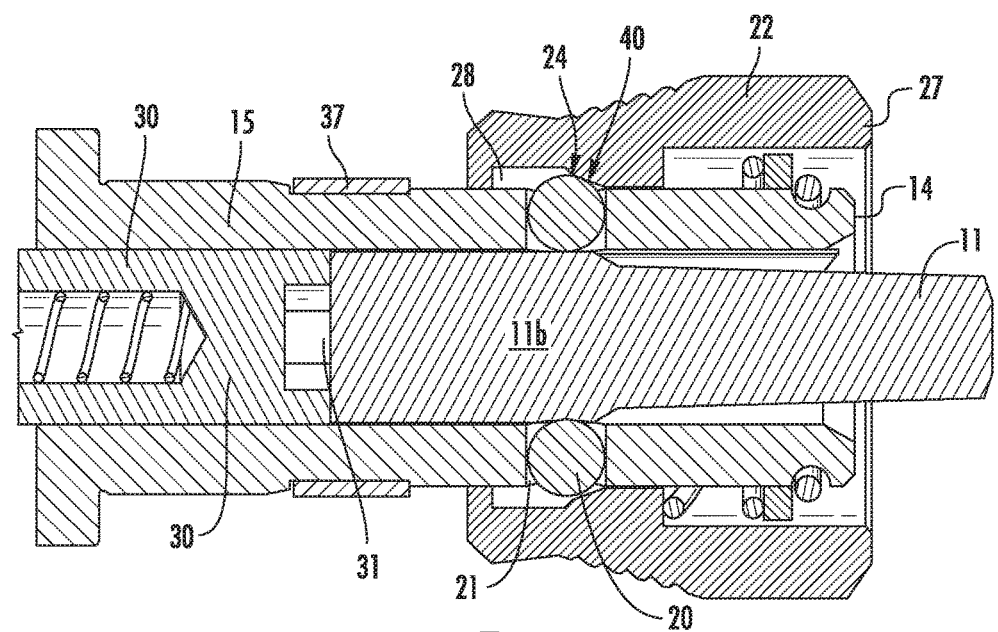
FIG. 7 is a cross section illustration of the tool bit holder with a second type of tool bit shank frictionally engaged in the holder.
Figure 8:
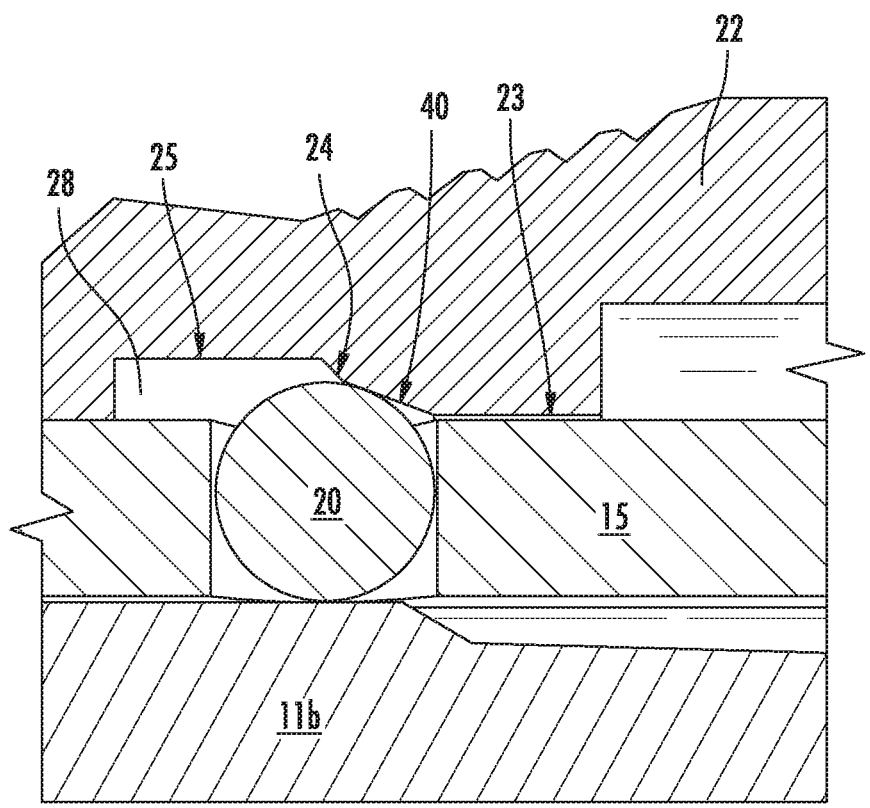
FIG. 8 is a partial cross section illustration of the tool bit holder with the second type of tool bit shank frictionally engaged in the holder.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Preferred embodiments of the invention will now be described to illustrate the invention. The terminology used is for illustrative purposes only and is not intended to limit the scope and/or use of the invention unless the context clearly requires otherwise.

In the drawings there is shown a preferred embodiment of a tool bit holder 10 according to the invention. The tool bit holder 10 is used for connecting a rotary tool 11, such as a driver bit the removably engages the head of a fastener for rotateably driving/securing the fastener, to a rotary tool (not shown), such as an electric drill or driver. Tool bit holders of this type are sometimes referred to as a chuck or more particular a sub-type of chuck known as a collet. The tool bit holder 10 includes a body 12 having a first driver end 13 and a second tool end 14. The driver end 13 is configured to connect to a rotary tool driver usually by way of a threaded bore or boss that secures to the threaded end of the driver output spindle. The tool end 14 has a shaft 15 with an annular side-wall surrounding a bore or cavity 16 that receives the shank end 11*a* of a tool bit 11. Typically, although not exclusively, the cavity 16 has a hexagonal-shaped profile for accommodating a hex-shank tool bit. The cavity 16 is, of course, open at the tool end 14 of the tool bit holder 10 for removably receiving a tool bit shank 11*a* into the cavity 16, and extends longitudinally along the central longitudinally axis of the tool bit holder shaft 15 towards the tool end 13. The tool end 13 of the bore or cavity 16 is closed or blind.

A tool retainer bore 21 extends radially through the side-wall of the shaft 15 and communicates with the tool receiving cavity 16. A tool retainer ball 20 is movably located within the tool retainer bore 21, and is movable within the tool retainer bore 21 between an engaged position and a retracted position. In the engaged position a portion of the tool retainer ball 20 extends into the tool receiving cavity 16, and in one configuration locates within a recess of the tool shank 11*a* received within the tool receiving cavity 16. In this engaged position the tool bit 11 is prevented from being removed from the tool bit holder 10 by the retainer ball 20 engaging with the tool shank 11*a* recess. In the retracted position the retainer ball 20 is retracted out of the tool receiving cavity 16. To remove the tool bit 11 the retainer ball 20 must be moved to the retracted position in which the retainer ball 20 is retracted out of the tool receiving cavity 16 and tool shank 11*a* recess.

The tool retainer ball 20 is controlled by internal wall portions of a longitudinally movable actuator sleeve 22 located annually surrounding the tool bit holder shaft 15. The actuator sleeve 22 has a first internal wall portion 23 and a second internal wall portion 25. The first internal wall portion 23 is positioned closer to the tool end 14 of the shaft 15 than the second internal wall portion 25, and has a first radial dimension that engages the tool retainer ball 20 in the engaged position to engage a tool shank 11*a* recess. The second internal wall portion 25 is located rearward of the first internal wall portion 23, closer to the driver end 13 of the tool bit holder 10, and has a second radial dimension that is larger than the first radial dimension. The second internal wall portion 25 allows the tool retainer ball 20 to retract to its retracted position in which the tool retainer 20 is retractable out of the tool receiving cavity 16 to disengage a tool bit shank 11*a* received in the tool receiving cavity 16.

The actuator sleeve 22 is longitudinally movable on or along the shaft 15 between a first actuator sleeve position and a second actuator sleeve position. A sleeve spring 26 surrounds the shaft 15 and engages with the actuator sleeve 22 for urging the actuator sleeve 22 towards the first sleeve position when the sleeve 22 is not manually manipulated by a user. In the first sleeve position a forward edge 27 of the actuator sleeve 22 is proximately located with the open tool end 14 of the tool receiving cavity 16, and the first internal wall portion 23 locates over or adjacent the outer opening of the tool retainer bore 21 such that the first internal wall portion 23 is engageable with the tool retainer 20. The actuator sleeve 22 is, in use, manually manipulated by a user, against the urging of the sleeve spring 26 in a working direction of the tool away from the driver end 13 of the tool holder 10 to the second position. In the second position the forward edge 27 of the actuator sleeve 22 extends beyond the open tool end 14 of the tool receiving cavity 16 and the second internal wall portion 25 locates over or adjacent the outer opening of the tool retainer bore 21 such that the second dimension of the second internal wall portion 25 provides a recess area 28 between the sleeve 22 and outer circumference of the shaft 15. This recess area 28 allows the tool retainer 20 to move to its retracted position.

In one embodiment the tool bit holder 10 includes a plunger 30 located within the tool receiving cavity 16 towards the tool end 13 of the cavity 16. The plunger 30 has a plunger tool end 31 and a plunger driver end 32 and is movable between a loading (or unloaded) position forward towards the open tool end 14 of the cavity 16 and a loaded position rearward towards the closed driver end 13 of the cavity 16. A plunger spring 33 is located between the driver end 32 of the plunger and the closed driver end 13 of the tool receiving cavity 16. The plunger spring 33 urges the plunger 30 towards the loading position. When a shank 11*a* of a tool bit is received in the tool receiving cavity 16 it pushes the plunger 30, against the urging force of the plunger spring 33, towards the loaded position, compressing the plunger spring 33 between the plunger driver end 32 and closed driver end 13 of the cavity 16. The tool bit shank 11*a* is held in position within the cavity 16 against the force of the plunger 30 and plunger spring 33 by the tool retainer ball 20 extending into the cavity 16 in the engaged position to engage a tool shank 11*a* recess. The tool bit retainer ball 20 is in turn held in the engaged position by the first internal wall portion 23 of the actuator sleeve 22 in its first position. When a user manipulates the actuator sleeve 22 away from the driver end 13 towards its second position the first internal wall portion 23 moves away from the tool retainer bore 21 until the second internal wall portion 25 locates over the outer opening of the tool retainer bore 21. Urging of the plunger spring 33 against the tool bit shank 11*a* causes the retainer ball 20 to be pushed to its retracted position within recess area 28 allowing the tool bit shank 11*a* to be push partially out of the tool receiving cavity 16 by the spring biased plunder 30. The tool bit shank 11*a* is extended out of the tool receiving cavity 16 until the plunger spring force moves the plunger 30 to its loading position. In the loading position the plunger 30 extends over the inner cavity 16 opening of the tool retainer bore 21 to engage the tool retainer ball 20 and urge the tool retainer 20 towards the retracted position. Because of the loading position of the plunger 30 the retainer ball 20 is prevented from moving back to its engaged position. The retainer ball 20 engages against the second internal wall portion 25 and a transition internal wall portion 24 of the actuator sleeve 22 preventing the actuator sleeve 22 from moving back towards its first position by force of the sleeve spring 26. The retainer ball 20 and actuator sleeve 22 remain in this loading position until the user pushed the, or another, tool bit shank 11*a* into the tool receiving cavity 16 to push the plunger 30 back to its loaded position. This configuration allows single handed loading of a tool bit without the user needed to use a second hand to manually manipulate the actuator sleeve 22 when loaded a tool bit. The retainer ball 20 and actuator sleeve 22 are held in a loading configuration by the plunger 30 whenever a tool bit shank 11*a* is not presently received within the tool receiving cavity 16.

The position of the plunger 30 is set by a plunger retainer 34 positioned within a plunger retaining bore 35 radially extending through the side-wall of the shaft 15 and communicating with the tool receiving cavity 16. In the illustrated embodiment, the tool retainer bore 21 and plunger retaining bore 35 are circumferentially off-set from each other by 90 degrees. The plunger retainer 34 extends partially into the tool receiving cavity 16 and within a closed longitudinally extending retainer channel 36 in a portion to the plunger 30. The plunger retainer 34 and retainer channel 36 together define the limits the plunger 30 movement between the loaded and loading positions. A plunger retainer ring 37 annually surrounding the shaft 15 has an internal wall that engages the plunger retainer 34 to maintain the plunger retainer 34 extending partially into the tool receiving cavity 16 and within the closed longitudinally extending retainer channel 36.

In yet another embodiment the tool bit holder 10 also or alternatively includes a third intermediate position of the actuator sleeve 22 and tool retainer ball 20. As before, the actuator sleeve 22 includes a first internal wall portion 23 with a first radial dimension, a second internal wall portion 25 with a second radial dimension and a transition wall portion 24 extending between the first internal wall portion 23 and second internal wall portion 25. The actuator sleeve 22 is longitudinally movable on the shaft 15 between the first position in which the first internal wall portion 23 engages the tool retainer 20 in the engaged position to engage a tool bit shank 11a received in the tool receiving cavity 16, and the second position in which the second internal wall portion 25 allows the tool retainer 20 to retract to the retracted position in which the tool retainer 20 is retractable out of the tool receiving cavity 16 to disengage a tool bit shank 11a received in the tool receiving cavity 16. The transition wall portion 24 has a chamfer 40 adjacent the first internal wall portion 23. The chamfer 40 has a curvilinear shape that is complimentary to the tool retainer ball 20. The actuator sleeve 22 has a sleeve intermediate position between the first position and second position in which the chamfer 40 engages the tool retainer 20 and urges the tool retainer towards a retainer intermediate position between the retracted position and the engaged position. In this retainer intermediate position the retainer ball 20 is urged towards the tool receiving cavity 16 to frictionally engage a second type of tool shank 11b within the tool receiving cavity 16. The sleeve spring 26 exerts a continuous bias force on the actuator sleeve 20, which in turn exerts a continuous force on the retainer ball 20 via the translation wall portion and chamfer 40. The retainer ball 20 is, accordingly, continually being urged towards its engaged position to apply a frictional retaining force on the second type of tool bit shank 11b without a tool shank recess.

Various features and advantages of the invention are set forth in the following claims.

What is claimed is:

1. A tool bit holder for connecting a rotary tool to a rotary tool driver, the tool bit holder comprising:
   a body including a driver end configured to connect to a rotary tool driver and a tool end, the tool end having a shaft which has a annular side-wall surrounding a longitudinally extending tool receiving cavity open at the tool end and closed towards the driver end,
   a tool retainer bore radially extending through the side-wall and communicating with the tool receiving cavity,
   a tool retainer movably received within the tool retainer bore and movable between an engaged position in which a portion of the tool retainer extends into the tool receiving cavity and a retracted position in which the tool retainer is retractable out of the tool receiving cavity,
   an actuator sleeve disposed annually surrounding the shaft and having a first internal wall portion with a first radial dimension and a second internal wall portion with a second radial dimension, the actuator sleeve longitudinally movable on the shaft between a first position in which the first internal wall portion engages the tool retainer in the engaged position to engage a tool bit received in the tool receiving cavity, and a second position in which the second internal wall portion allows the tool retainer to retract to the retracted position in which the tool retainer is retractable out of the tool receiving cavity to disengage a tool bit received in the tool receiving cavity,
   a sleeve spring for urging the actuator sleeve towards the first position,
   a plunger disposed in the tool receiving cavity, the plunger having a driver end and a tool end, and movable between a loading position towards the open tool end of the cavity and a loaded position towards the closed driver end of the cavity,
   a plunger spring urging the plunger towards the loading position, wherein a tool bit received in the tool receiving cavity pushes the plunger to the loaded position, and wherein in the loading position the plunger extends over the tool retainer bore to engage the tool retainer and urge the tool retainer towards the retracted position,
   a plunger retaining bore radially extending through the side-wall and communicating with the tool receiving cavity, and
   a plunger retainer positioned within the plunger retaining bore, the plunger retainer extending partially into the tool receiving cavity and into a longitudinally extending retainer channel in the plunger, the plunger retainer and the retainer channel together defining limits of the movement of the plunger between the loading and loaded positions,
   wherein the plunger retainer and the tool retainer are separately formed.

2. The tool bit holder of claim 1, further including a plunger retainer ring annually surrounding the shaft, the plunger retainer ring having an internal wall that engages the plunger retainer to maintain the plunger retainer extending partially into the tool receiving cavity and within the closed longitudinally extending retainer channel.

3. The tool bit holder of claim 1, wherein the tool retainer bore and plunger retaining bore are circumferentially off-set from each other by 90 degrees.

4. The tool bit holder of claim 1, wherein the actuator sleeve further includes a transition wall portion between the first internal wall portion and second internal wall portion, the transition wall having a chamfer with a curvilinear shape that is complimentary to the tool retainer, and an sleeve intermediate position between the first position and second position in which the chamfer engages the tool retainer and urges the tool retainer towards a retainer intermediate position between the retracted position and the engaged position.

5. The tool bit holder of claim 4, wherein the chamfer partially engages with the first internal wall portion.

6. The tool bit holder of claim 4, wherein in the retainer intermediate position the tool retainer is urged towards a tool bit received in the tool receiving cavity to frictionally engage the tool bit without the tool retainer extending into the tool receiving cavity.

7. A tool bit holder for connecting a rotary tool to a rotary tool driver, the tool bit holder comprising:
   a body including a driver end configured to connect to a rotary tool driver and a tool end, the tool end having a shaft which has a annular side-wall surrounding a longitudinally extending tool receiving cavity open at the tool end and closed towards the driver end, a tool retainer bore radially extending through the side-wall and communicating with the tool receiving cavity, a tool retainer movably received within the tool retainer bore and movable between an engaged position in which a portion of the tool retainer extends into the tool receiving cavity and a retracted position in which the tool retainer is retractable out of the tool receiving cavity, an actuator sleeve disposed annually surrounding the shaft and having a first internal wall portion with a first radial dimension, a second internal wall portion with a second radial dimension and a transition wall portion extending between the first internal wall portion and second internal wall portion, the actuator sleeve longitudinally movable on the shaft between a first position in which the first internal wall portion engages the tool retainer in the engaged position to engage a tool bit received in the tool receiving cavity, and a second position in which the second internal wall portion allows the tool retainer to retract to the retracted position in which the tool retainer is retractable out of the tool receiving cavity to disengage a tool bit received in the tool receiving cavity, a sleeve spring for urging the actuator sleeve towards the first position, and wherein the transition wall has a chamfer with a curvilinear shape that is complimentary to the tool retainer, the actuator sleeve having an sleeve intermediate position between the first position and second position in which the chamfer engages the tool retainer and urges the tool retainer towards a retainer intermediate position between the retracted position and the engaged position, a plunger disposed in the tool receiving cavity, the plunger having a driver end and a tool end, and movable between a loading position towards the open tool end of the cavity and a loaded position towards the closed driver end of the cavity, a plunger spring urging the plunger towards the loading position, wherein a tool bit received in the tool receiving cavity pushes the plunger to the loaded position, and wherein in the loading position the plunger extends over the tool retainer bore to engage the tool retainer and urge the tool retainer towards the retracted position, a plunger retaining bore radially extending through the side-wall and communicating with the tool receiving cavity, and a plunger retainer positioned within the plunger retaining bore, the plunger retainer extending partially into the tool receiving cavity and into a longitudinally extending retainer channel in the plunger, the plunger retainer and the retainer channel together defining limits of the movement of the plunger between the loading and loaded positions.

8. The tool bit holder of claim 7, wherein the chamfer partially engages with the first internal wall portion.

9. The tool bit holder of claim 7, wherein in the retainer intermediate position the tool retainer is urged towards a tool bit received in the tool receiving cavity to frictionally engage the tool bit without the tool retainer extending into the tool receiving cavity.

10. The tool bit holder of claim 7, further including a plunger retainer ring annually surrounding the shaft, plunger retainer ring having an internal wall that engages the plunger retainer to maintain the plunger retainer extending partially into the tool receiving cavity and within the closed longitudinally extending retainer channel.

11. The tool bit holder of claim 7, wherein the tool retainer bore and plunger retaining bore are circumferentially off-set from each other by 90 degrees.

12. A tool bit holder for connecting a rotary tool to a rotary tool driver, the tool bit holder comprising:

a body including an annular side-wall surrounding a tool receiving cavity;

a tool retainer bore extending through the side-wall and communicating with the tool receiving cavity;

a tool retainer movable along the tool retainer bore between an engaged position in which a portion of the tool retainer extends into the tool receiving cavity and a retracted position in which the tool retainer is retracted out of the tool receiving cavity;

a plunger disposed in the tool receiving cavity and movable between a loading position in which the plunger extends over the tool retaining bore to engage the tool retainer and urge the tool retainer toward the retracted position, and a loaded position in which the plunger is disposed rearward of the tool retaining bore, wherein the plunger is movable to the loaded position upon insertion of a tool bit into the tool receiving cavity;

a plunger spring urging the plunger towards the loading position;

a plunger retaining bore extending through the side-wall and communicating with the tool receiving cavity; and a plunger retainer positioned within the plunger retaining bore, the plunger retainer extending partially into the tool receiving cavity and engageable with the plunger to define the limits of movement of the plunger between the loading position and the loaded position, wherein the plunger retainer and the tool retainer are not directly interconnected.

* * * * *